United States Patent
Kikuchi et al.

(10) Patent No.: US 12,012,168 B2
(45) Date of Patent: Jun. 18, 2024

(54) STRUCTURE FOR MOUNTING WINDSHIELD

(71) Applicant: KAWASAKI MOTORS, LTD., Akashi (JP)

(72) Inventors: Hidenori Kikuchi, Akashi (JP); Daisuke Watanabe, Akashi (JP)

(73) Assignee: KAWASAKI MOTORS, LTD. (JP)

( * ) Notice: Subject to any disclaimer, the term of this patent is extended or adjusted under 35 U.S.C. 154(b) by 216 days.

(21) Appl. No.: 17/539,563

(22) Filed: Dec. 1, 2021

(65) Prior Publication Data
US 2022/0177064 A1    Jun. 9, 2022

(30) Foreign Application Priority Data
Dec. 3, 2020   (JP) ................. 2020-200844

(51) Int. Cl.
| B62J 11/00 | (2020.01) |
| B62J 17/00 | (2020.01) |
| B62J 17/02 | (2006.01) |
| B62J 17/04 | (2006.01) |
| B62K 13/08 | (2006.01) |

(52) U.S. Cl.
CPC ............ B62J 11/00 (2013.01); B62J 17/00 (2013.01); B62J 17/02 (2013.01); B62J 17/04 (2013.01); B62K 13/08 (2013.01)

(58) Field of Classification Search
CPC ... B62J 17/04; B62J 11/00; B62J 17/02; B62J 17/00; B62K 13/08
See application file for complete search history.

(56) References Cited

U.S. PATENT DOCUMENTS

| 7,100,471 | B2 * | 9/2006 | Irie ................. | B62K 23/06 |
| | | | | 192/217 |
| 2002/0041107 | A1 | 4/2002 | Takemura et al. | |

FOREIGN PATENT DOCUMENTS

| EP | 1975050 A | 10/2008 | | |
| EP | 2374700 | 10/2011 | | |
| ES | 2384407 T3 * | 7/2012 | ............. | B62J 17/04 |
| JP | 2008-238872 A | 10/2008 | | |
| JP | 5495909 | 3/2014 | | |
| JP | 2019-051836 A | 4/2019 | | |

OTHER PUBLICATIONS

ES-2384407-T3 Computer translation (Year: 2012).*

* cited by examiner

*Primary Examiner* — Amy R Weisberg
*Assistant Examiner* — Melissa Ann Bonifazi
(74) *Attorney, Agent, or Firm* — SNELL & WILMER LLP

(57) ABSTRACT

A structure for mounting a windshield includes: an adjustment support mechanism which supports the windshield such that the windshield is slidable with respect to a vehicle body; an operation element operated when a position of the windshield is adjusted; and a linear member connecting the adjustment support mechanism and the operation element. The adjustment support mechanism is switched between a position-adjustable state and a position-nonadjustable state by the operation element being operated.

11 Claims, 14 Drawing Sheets

STRUCTURE FOR MOUNTING WINDSHIELD

CROSS REFERENCE TO THE RELATED APPLICATION

This application is based on and claims Convention priority to Japanese patent application No. 2020-200844, filed Dec. 3, 2020, the entire disclosure of which is herein incorporated by reference as a part of this application.

BACKGROUND OF THE INVENTION

Field of the Invention

The present disclosure relates to a structure for mounting a windshield which suppresses incoming wind received by the driver of a vehicle.

Description of Related Art

Some vehicles such as a motorcycle have been known in which a windshield for suppresses incoming wind received by a driver (for example, Japanese Patent No. 5495909). Some windshields are provided such that the position thereof is adjustable with respect to a vehicle body. In Japanese Patent No. 5495909, the position of a windshield can be adjusted with respect to a vehicle body by loosening a fastening member that fixes the windshield to the vehicle body, and sliding the windshield.

However, in the structure of Japanese Patent No. 5495909, the position of an operation element (fastening member) for position adjustment is also limited, so that the degree of freedom in design is low.

DISCLOSURE OF THE INVENTION

The present disclosure provides a structure, for mounting a windshield, which allows the position of the windshield to be adjusted with a simple structure and a simple operation.

A structure for mounting a windshield according to the present disclosure is a structure for mounting a windshield which suppresses incoming wind received by a driver of a vehicle, the structure including: an adjustment support mechanism which supports the windshield such that the windshield is slidable with respect to a vehicle body; an operation element operated when a position of the windshield is adjusted; and a linear member connecting the adjustment support mechanism and the operation element, wherein the adjustment support mechanism is switched between a position-adjustable state and a position-nonadjustable state via the linear member by the operation element being operated.

According to this configuration, the position-adjustable state and the position-nonadjustable state of the windshield can be switched by operating the operation element. That is, in a state where the operation element is operated with one hand, the windshield can be slid with the other hand. Accordingly, the position of the windshield can be adjusted with a simple structure and a simple operation. In addition, an operation force is transmitted via the linear member, and thus the operation element and the adjustment support mechanism can be disposed so as to be separated from each other, so that the degree of freedom in design is improved.

Any combination of at least two constructions, disclosed in the appended claims and/or the specification and/or the accompanying drawings should be construed as included within the scope of the present disclosure. In particular, any combination of two or more of the appended claims should be equally construed as included within the scope of the present disclosure.

BRIEF DESCRIPTION OF THE DRAWINGS

In any event, the present disclosure will become more clearly understood from the following description of preferred embodiments thereof, when taken in conjunction with the accompanying drawings. However, the embodiments and the drawings are given only for the purpose of illustration and explanation, and are not to be taken as limiting the scope of the present disclosure in any way whatsoever, which scope is to be determined by the appended claims. In the accompanying drawings, like reference numerals are used to denote like parts throughout the several views, and:

DESCRIPTION OF EMBODIMENTS

Figure 1:
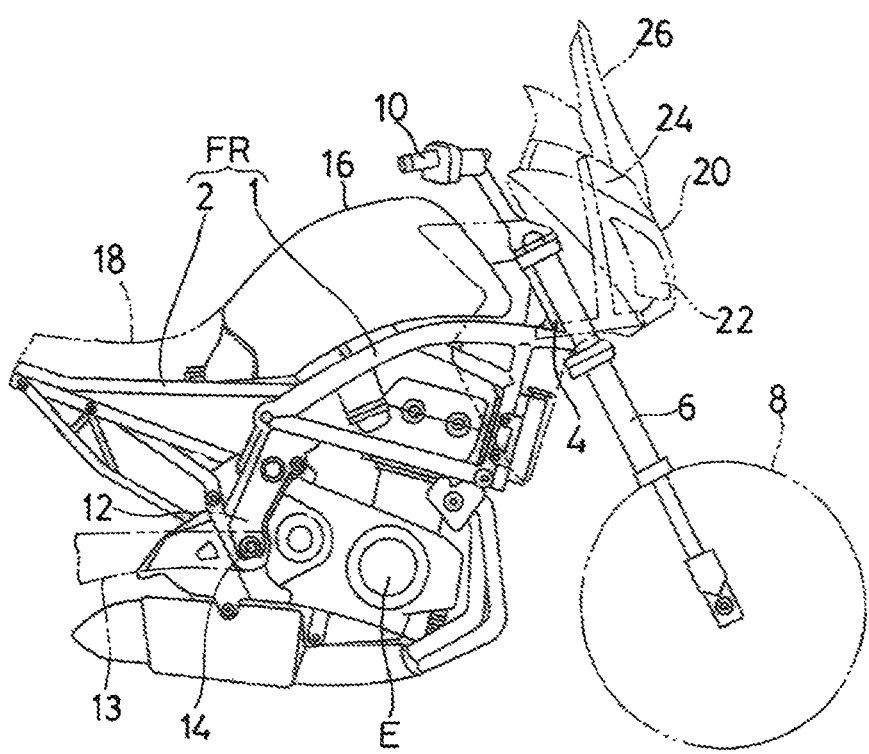
FIG. 1 is a side view showing a front portion of a motorcycle which is a type of vehicle including a structure for mounting a windshield according to a first embodiment of the present disclosure.

Hereinafter, preferred embodiments of the present disclosure will be described with reference to the drawings. FIG. 1 is a side view showing a front portion of a motorcycle which is a type of vehicle including a structure for mounting a windshield according to a first embodiment of the present disclosure. As used herein, the terms "right" and "left" refer to "right" and "left" as seen from a driver on a vehicle. In addition, the terms "front" and "rear" refer to "front" and "rear" in the travelling direction of the vehicle.

A motorcycle frame structure FR of the motorcycle of the present embodiment includes: a main frame 1 which forms a front half of the motorcycle frame structure FR; and a rear frame 2 which forms a rear half of the motorcycle frame structure FR. The rear frame 2 is connected to a rear portion of the main frame 1.

A front fork 6 is rotatably supported on a head pipe 4 at the front end of the main frame 1 via a steering shaft which is not shown. A front wheel 8 is mounted on the lower end of the front fork 6. A handle 10 is mounted on an upper end portion of the front fork 6.

The main frame 1 includes a swing arm bracket 12 at a rear end portion thereof. A front end portion of a swing arm 13 is supported on the swing arm bracket 12 for swing movement in the up-down direction or vertical direction about a pivot shaft 14. A rear wheel (not shown) is mounted on a rear end portion of the swing arm 13.

An engine E, which is a drive source, is mounted below the main frame 1 and in front of the swing arm bracket 12. The rear wheel (not shown) is driven by the engine E via a power transmission member (not shown) such as a chain. A fuel tank 16 is disposed at an upper portion of the main frame 1, and a seat 18 on which a rider sits is mounted on the rear frame 2.

A front cowl or front fairing 20 made of a resin is mounted on a front portion of a vehicle body, and a headlamp 22 is mounted on the front cowl 20. The front cowl 20 is detachably mounted on the motorcycle frame structure FR via a cowl stay 24. The front cowl 20 of the present embodiment covers an area in front of the head pipe 4. The shape of the front cowl 20 is not limited thereto. The cowl stay 24 is configured by connecting a plurality of steel pipes by means of welding.

A windshield 26 made of a transparent resin is disposed at an upper end portion of the front cowl 20. The windshield 26 suppresses running wind or incoming wind received by the driver of the vehicle. The windshield 26 is also detachably mounted on the motorcycle frame structure FR via the cowl stay 24.

The windshield 26 is mounted so as to be slidable with respect to the cowl stay 24 (vehicle body). In the present embodiment, the windshield 26 is slidable in the substantially vertical direction with respect to the vehicle body. Specifically, the sliding direction of the windshield 26 is inclined rearward toward the upper side.

Figure 2:
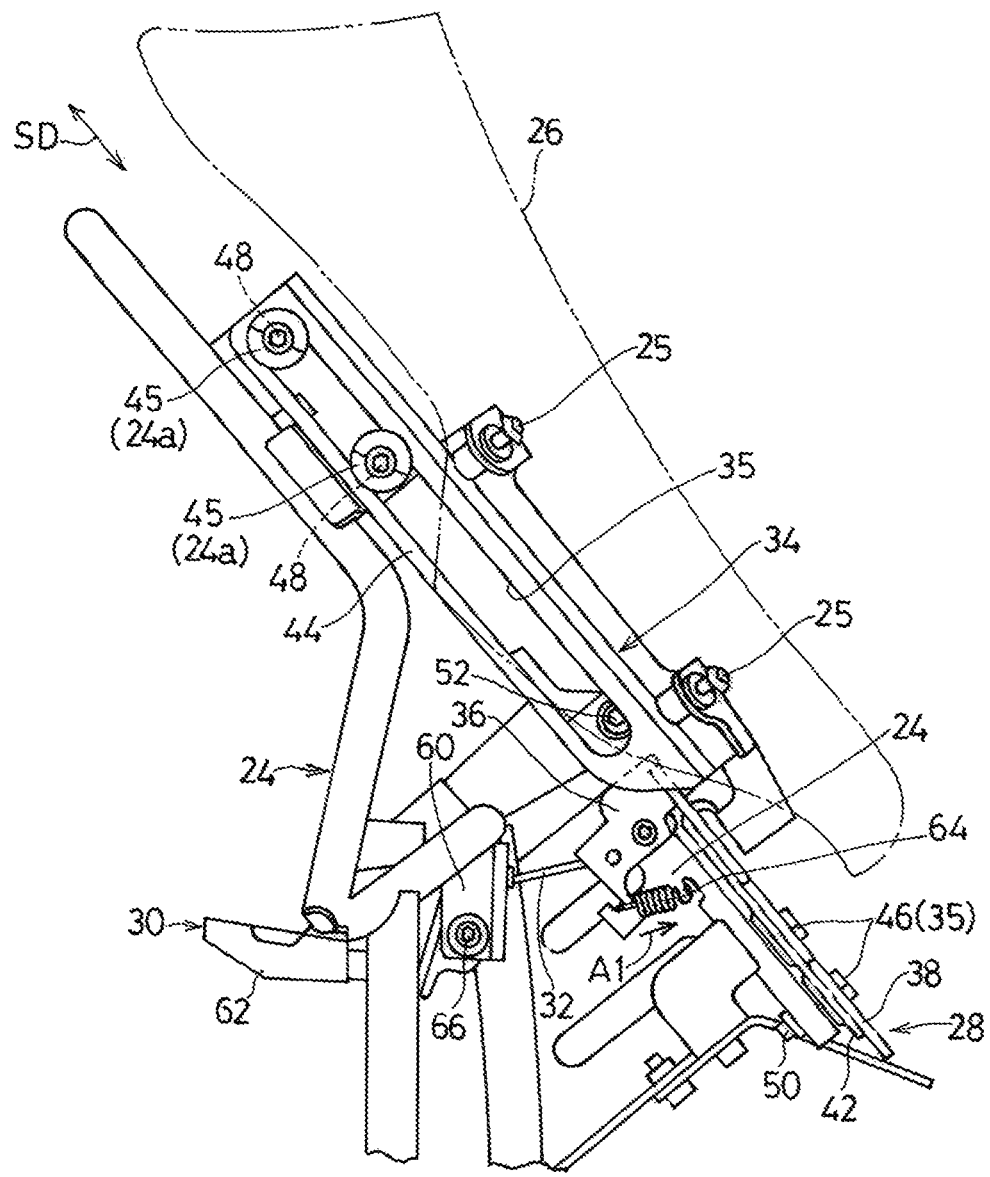
FIG. 2 is a side view showing the structure for mounting the windshield and a cowl stay.

As shown in FIG. 2, the windshield 26 is supported via an adjustment support mechanism 28 so as to be slidable with respect to the cowl stay 24 which is a part of the vehicle body. That is, the adjustment support mechanism 28 supports the windshield 26 such that the windshield 26 is slidable with respect to the vehicle body in a sliding direction SD. In the present embodiment, the adjustment support mechanism 28 is mounted on the cowl stay 24.

An operation element 30 is disposed on the vehicle body side, and the adjustment support mechanism 28 and the operation element 30 are connected by a linear member 32. The operation element 30 is manually operated when the position of the windshield 26 is adjusted. That is, the adjustment support mechanism 28 is switched between a position-adjustable state and a position-nonadjustable state by operating the operation element 30. Specifically, position adjustment is made possible when an operation force is applied to the operation element 30, and is made impossible when the operation force is released. The operation force applied to the operation element 30 is transmitted via the linear member 32 to the adjustment support mechanism 28.

In the present embodiment, the operation element 30 is a lever rotatably supported on the vehicle body, and the linear member 32 is a wire made of a metal. The operation element 30 and the linear member 32 are not limited thereto. The operation element 30 and the linear member 32 will be described in detail later.

The adjustment support mechanism 28 of the present embodiment changes the position of the windshield 26 stepwise. Specifically, the adjustment support mechanism 28 includes a sliding member 34 and a switching member 36. The windshield 26 is mounted on the sliding member 34, and the sliding member 34 is supported so as to be slidable with respect to the vehicle body (cowl stay 24). The windshield 26 is detachably mounted on the sliding member 34 by a plurality of fastening members 25.

Figure 3:
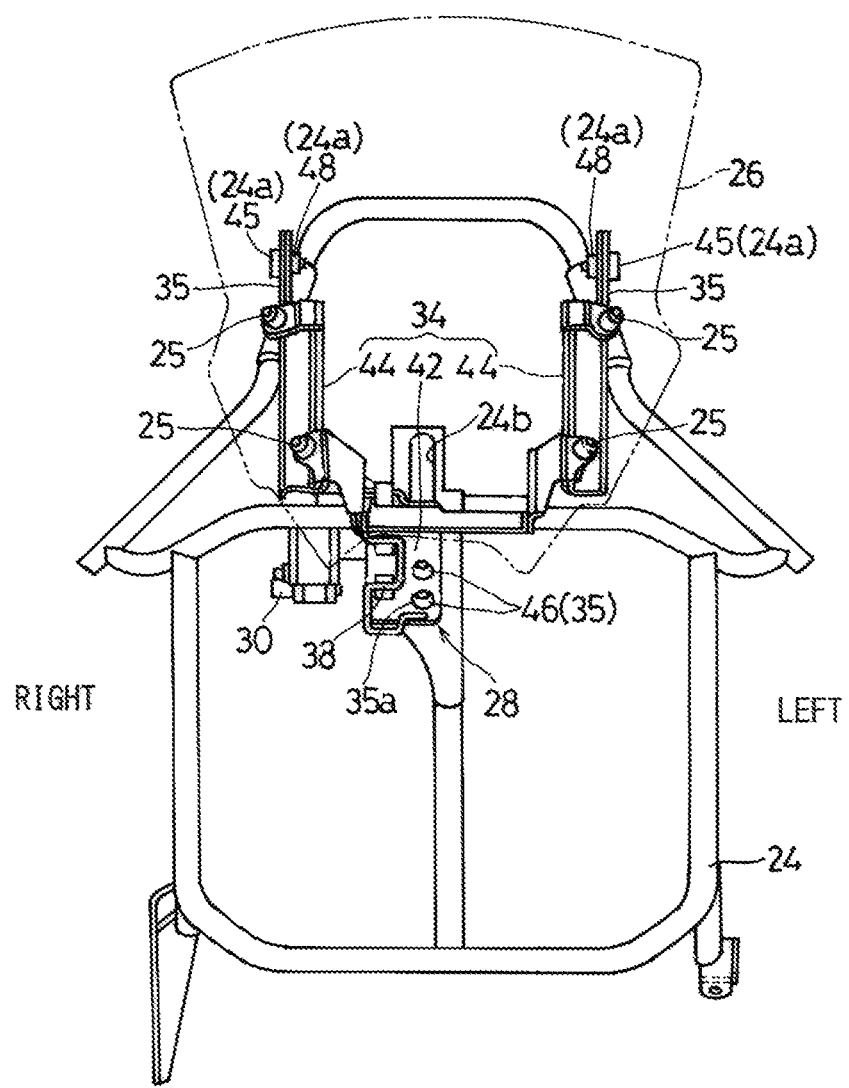
FIG. 3 is a front view showing the structure for mounting the windshield and the cowl stay.

The sliding member 34 has a substantially U-shape in a front view. Specifically, the sliding member 34 is composed of a plate made of steel, and includes: a plate portion 42 located at the center in the vehicle width direction of the vehicle body; and a pair of right and left branch portions 44 connected to the plate portion 42, as shown in FIG. 3. Each branch portion 44 extends in the vehicle width direction from the plate portion 42 and subsequently extends in the sliding direction.

The sliding member 34 includes a guide portion 35 which is slid and guided with respect to the vehicle body. In the present embodiment, the guide portion 35 is disposed at three locations, at both side portions in the vehicle width direction and a middle portion in the vehicle width direction. That is, the guide portion 35 is disposed at each of the plate portion 42 and the right and left branch portions 44.

As shown in FIG. 2, the guide portion 35 at each of the right and left branch portions 44 is composed of a slit-shaped groove extending in the sliding direction. As shown in FIG. 3, the guide portion 35 at the plate portion 42 at the center is composed of an insertion hole 35a and a fastening member 46 inserted into the insertion hole 35a. In the present embodiment, there are two insertion holes 35a so as to be aligned in the sliding direction. However, the shape, the number, and the arrangement of the guide portions 35 are not limited thereto.

A shield mounting portion 24a is disposed at a position corresponding to each guide portion 35 in the cowl stay 24. That is, the shield mounting portion 24a is also disposed at three locations, at both side portions in the vehicle width direction and a middle portion in the vehicle width direction.

As shown in FIG. 2, the shield mounting portion 24a corresponding to the guide portion 35 at each branch portion 44 is composed of a screw hole 48 and a fastening member 45 screwed into the screw hole 48. The screw hole 48 is formed, for example, in a weld nut welded to the cowl stay 24. That is, the sliding member 34 of the adjustment support mechanism 28 is supported so as to be slidable in the position-adjustable state by inserting the fastening member 45 into a through groove 35 which is the guide portion 35 at the branch portion 44, and tightening the fastening member 45 to the screw hole 48 of the shield mounting portion 24a. The sliding member 34 of the adjustment support mechanism 28 slides with respect to the cowl stay 24 by guiding the groove 35, which is the guide portion 35, through the fastening member 45.

As shown in FIG. 3, a shield mounting portion 24b corresponding to the guide portion 35 at the plate portion 42 at the center is composed of a slit-shaped groove extending in the sliding direction. That is, the fastening member 46 is inserted into the insertion hole 35a at the plate portion 42 and the through groove 24b which is the shield mounting portion 24b at the cowl stay 24, and is tightened by a nut 50 (FIG. 2) to prevent the fastening member 46 from coming off. Accordingly, the sliding member 34 of the adjustment support mechanism 28 is supported so as to be slidable with respect to the cowl stay 24 in the position-adjustable state. The sliding member 34 of the adjustment support mechanism 28 slides with respect to the cowl stay 24 by guiding the fastening member 46, which is the guide portion 35, through the groove 24b which is the shield mounting portion 24b. The movement of the adjustment support mechanism 28 is stabilized since the adjustment support mechanism 28 is supported at three points as described above.

A positioning portion 38 is arranged at the plate portion 42 of the sliding member 34. The positioning portion 38 is disposed so as to be aligned with the sliding member 34 in the sliding direction. In the present embodiment, the positioning portion 38 is composed of a bent wire. The positioning portion 38 is disposed on one surface of the plate portion 42, specifically, on the upper surface of the plate portion 42.

The switching member 36 shown in FIG. 2 is rotatably supported on the vehicle body, that is, on the cowl stay 24. Specifically, the switching member 36 is rotatably supported on the cowl stay 24 by a pivot member 52 (FIG. 5) extending in the vehicle width direction. The pivot member 52 is, for example, a fastening member such as a bolt. The switching member 36 switches the sliding member 34 between a slidable state and a non-slidable state by rotating by operation of the operation element 30.

Figure 7:
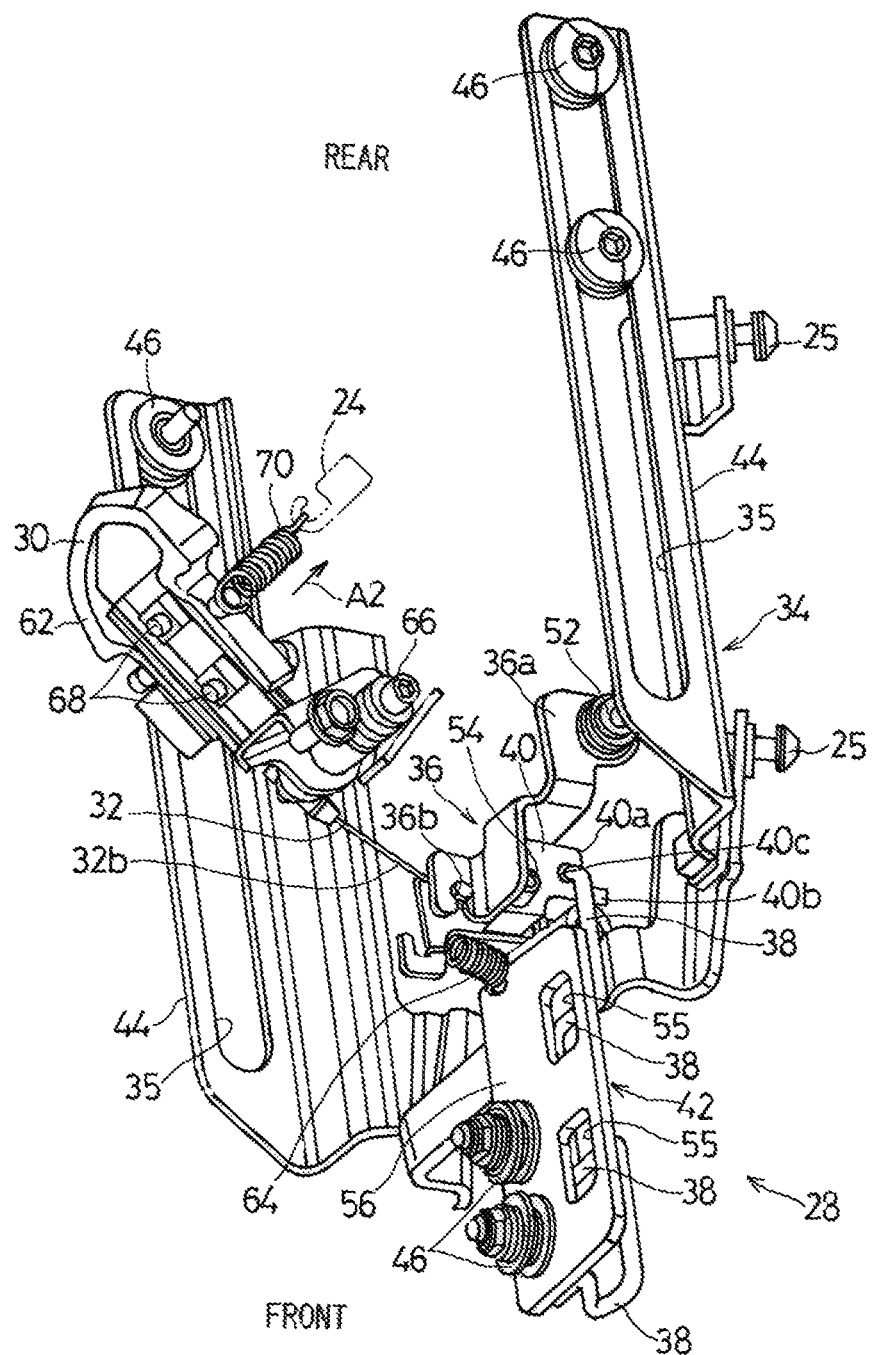
FIG. 7 is a perspective view of the structure for mounting the windshield as seen obliquely from the lower lateral side.

As shown in FIG. 7, the switching member 36 includes an engagement portion 40 which is engaged with the positioning portion 38. In the present embodiment, the engagement portion 40 is composed of an engagement claw which is engaged with the wire 38. The engagement claw 40 is engaged with the wire 38 from the other surface side of the plate portion 42, that is, from the lower side. The positioning portion 38 and the engagement portion 40 are not limited thereto.

The engagement claw 40 of the present embodiment includes: a pair of claw pieces 40a and 40b aligned in the sliding direction which is substantially the vertical direction; and a groove portion 40c between the pair of claw pieces 40a and 40b. The wire 38 is fitted into the groove portion 40c. The lengths of the pair of claw pieces 40a and 40b are different from each other. Specifically, the upper claw piece 40a is shorter than the lower claw piece 40b.

The engagement claw 40 of the present embodiment is detachably fitted to a main body 36a of the switching member 36. Specifically, the engagement claw 40 is rotatably supported on the main body 36a of the switching member 36 by a pivot member 54 extending in the vehicle width direction. The pivot member 54 is, for example, a fastening member such as a bolt. In the present embodiment, the main body 36a of the switching member 36 is made of a metal material, and the engagement claw 40 is made of a resin (for example, nylon 66).

The plate portion 42 includes a through hole 55 therein through which the engagement claw 40 passes. In the present embodiment, there are two through holes 55 so as to be aligned in the front-rear direction or longitudinal direction of the vehicle body. The wire 38 is disposed such that a part thereof extends in the vehicle width direction above each through hole 55. The positioning portion 38 includes a bent wire fixed to the plate portion 42 by means of welding. A portion, of the wire, extending in the vehicle width direction forms the positioning portion 38.

In the present embodiment, the positioning portion 38 (portion, of the wire, extending in the vehicle width direction) is disposed at four locations, above the two through holes 55, above the front of the plate portion 42, and above the rear of the plate portion 42. That is, the adjustment support mechanism 28 of the present embodiment is capable of position adjustment in four stages. However, the position adjustment is not limited to position adjustment in four stages.

The sliding member 34 includes an engagement blocking surface 56 in the plate portion 42 at the center thereof. In the present embodiment, the lower surface of the plate portion 42 forms the engagement blocking surface 56. The engagement blocking surface 56 extends along the sliding direction. The engagement blocking surface 56 blocks the engagement portion 40 at a disengagement position from moving toward an engagement position, in the present embodiment, moving upward. The engagement blocking surface 56 may not necessarily be the lower surface of the plate portion 42, and may be a member separate from the plate portion 42. However, when the plate portion 42 also serves to form the engagement blocking surface 56, the need for welding, fastening, and the like is eliminated, and the structure can be simplified, as compared to the case where the engagement blocking surface 56 is a member separate from the plate portion 42.

Figure 5:
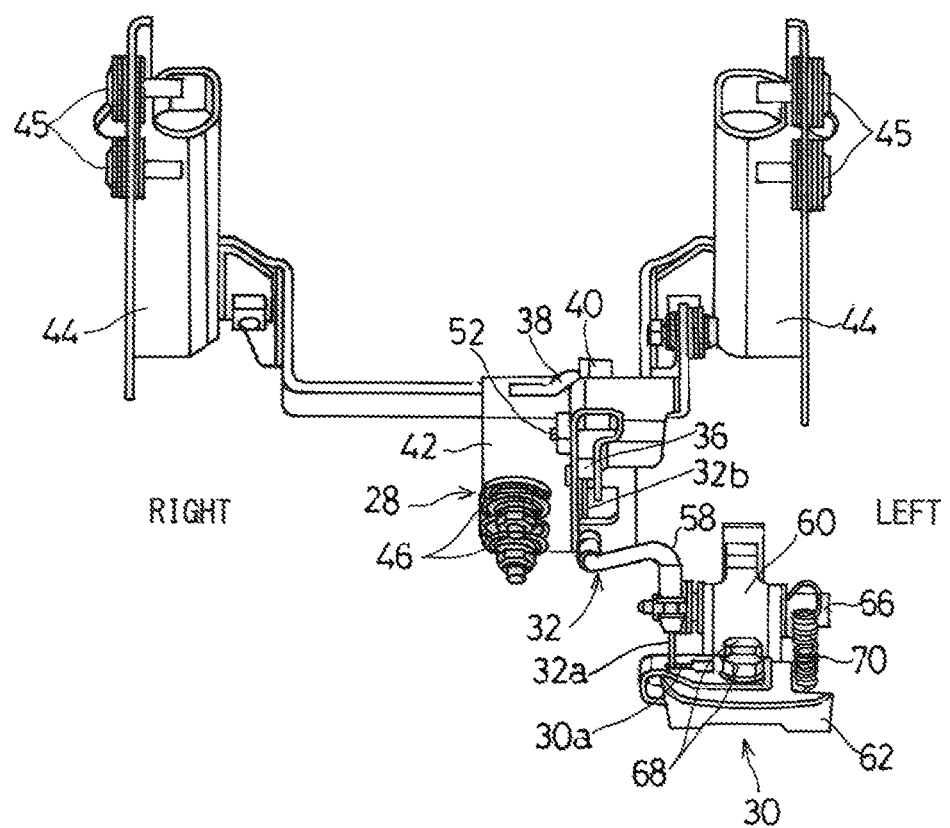
FIG. 5 is a rear view of the structure for mounting the windshield as seen from the rear side of a vehicle body.
Figure 6:
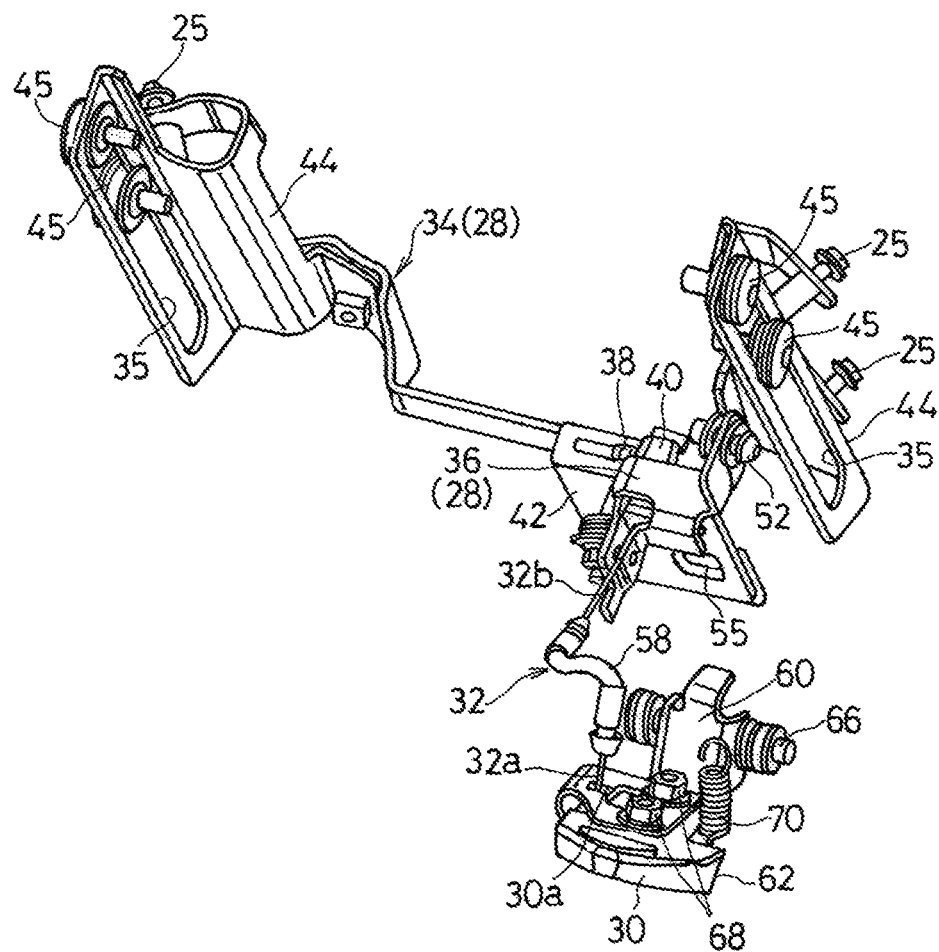
FIG. 6 is a perspective view of the structure for mounting the windshield as seen obliquely from the rear lateral side.

The adjustment support mechanism 28 further includes a first biasing member 64 which biases the adjustment support mechanism 28 in a direction in which the position-nonadjustable state is obtained. The first biasing member 64 is composed of, for example, a coil spring. As shown in FIG. 2, the first biasing member 64 is locked at one end thereof to the cowl stay 24, and is locked at another end thereof to the switching member 36 of the adjustment support mechanism 28. The first biasing member 64 applies a biasing force to the switching member 36 in the direction of an arrow A1. In FIG. 5 and FIG. 6, the first biasing member 64 is not shown.

The operation element 30 and the engagement portion 40 are disposed so as to be separated from each other in the longitudinal direction (FIG. 4) and the vehicle width direction (FIG. 5) of the vehicle body, and are connected by the wire 32 which is the linear member 32. Specifically, as shown in FIG. 5, the engagement portion 40 is disposed at a center portion in the vehicle width direction of the vehicle body, and the operation element 30 is provided at a position offset in the vehicle width direction from the center portion in the vehicle width direction of the vehicle body, in the present embodiment, at a position offset to the left from the center portion.

The linear member 32 is connected at one end portion 32a thereof to the operation element 30, and is connected at another end portion 32b thereof to the switching member 36 of the adjustment support mechanism 28. Specifically, the one end portion 32a of the linear member 32 shown in FIG. 6 is locked to a locking groove 30a on the operation element 30. Meanwhile, the other end portion 32b of the linear member 32 is locked to a locking groove 36b on the switching member 36. As shown in FIG. 5, the portion of the linear member 32 other than both end portions 30a and 30b thereof is protected by a coating material 58 made of a resin.

The operation element 30 includes a support portion 60 and an operation portion 62. The support portion 60 is formed by bending a plate material made of a metal, and is rotatably supported on the cowl stay 24. The support portion 60 is rotatably supported on the cowl stay 24 by a pivot member 66 extending in the vehicle width direction. The pivot member 66 is, for example, a fastening member such as a bolt.

The operation portion 62 is a portion that is manually operated by the driver, and is made of, for example, a resin such as plastic. The operation portion 62 is detachably mounted on the support portion 60 by a fastening member 68 such as a bolt.

The operation element 30 further includes a second biasing member 70 which biases the operation element 30 in a direction in which the position-nonadjustable state is obtained. The second biasing member 70 is composed of, for example, a coil spring. As shown in FIG. 7, the second biasing member 70 is locked at one end thereof to the operation portion 62 of the operation element 30, and is locked at another end thereof to the cowl stay 24. The second biasing member 70 applies a biasing force to the operation portion 62 in the direction of an arrow A2.

Figure 4:
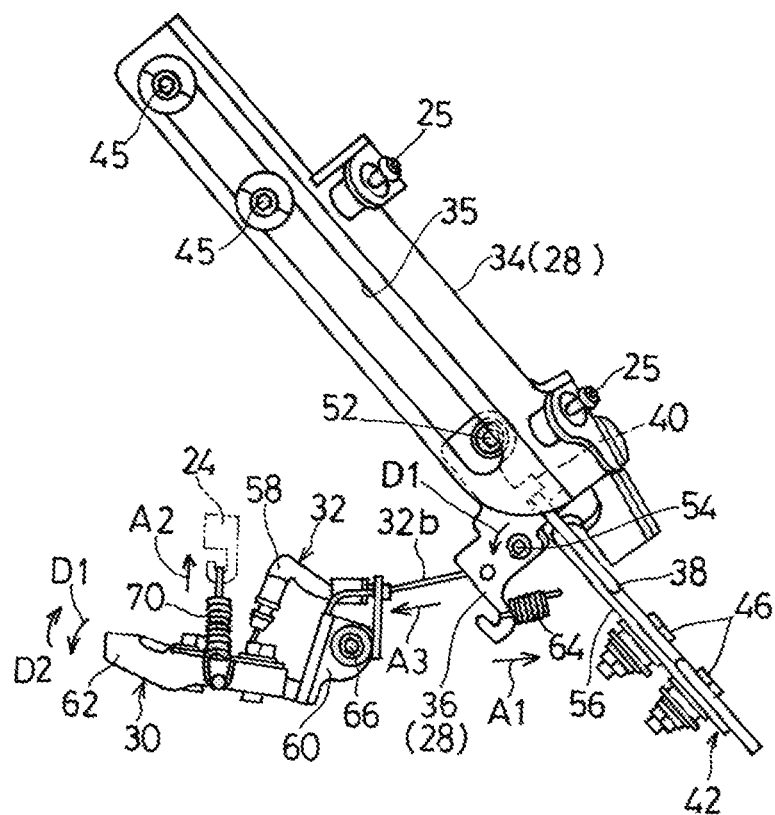
FIG. 4 is a side view showing the structure for mounting the windshield.

A procedure for adjusting the position of the windshield 26 of the present embodiment will be described. First, the operation portion 62 of the operation element 30 shown in FIG. 4 is operated in a first direction D1. Accordingly, the operation element 30 rotates about the pivot member 66, that is, downward in FIG. 4, against the biasing force of the second biasing member 70.

When the operation element 30 rotates, the linear member 32 is pulled in the direction of an arrow A3, and the switching member 36 of the adjustment support mechanism 28 rotates about the pivot member 52, that is, in the first direction D1, against the biasing force of the first biasing member 64, by the linear member 32. When the switching member 36 rotates, the engagement claw 40 which is an engagement portion comes off from the wire which is the positioning portion 38, and the position-adjustable state is obtained.

When the position-adjustable state is obtained, the operation of the operation portion 62 of the operation element 30 is released, and the sliding member 34 of the adjustment support mechanism 28 is slid. In the position-adjustable state shown in FIG. 8A, a force is applied to the switching member 36 in a second direction D2 around the pivot member 52 by the biasing force of the first biasing member 64 (FIG. 4).

Figure 8A:
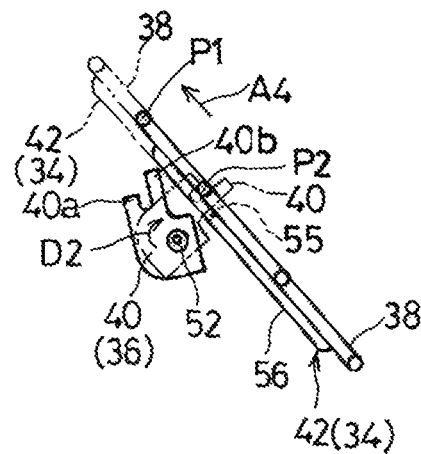
FIG. 8A is an enlarged side view showing a position-adjustable state of the structure for mounting the windshield.
Figure 8B:
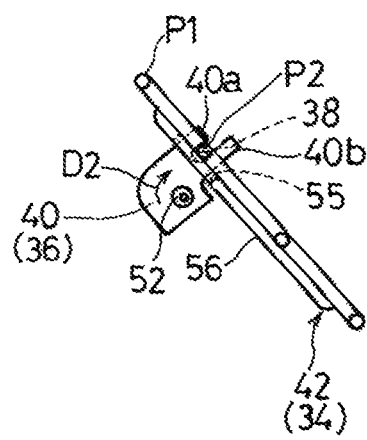
FIG. 8B is an enlarged side view showing a position-nonadjustable state of the structure for mounting the windshield.

In this state, the sliding member 34 is slid in the direction of an arrow A4 and moved to a position shown by a double dotted line. At this time, the sliding member 34 moves while the engagement blocking surface 56 thereof is sliding on the claw piece 40b of the engagement claw 40. In the present embodiment, since the engagement claw 40 is made of a resin, sliding between metals is avoided. FIG. 8A and FIG. 8B illustrate an example in which the position of the sliding member 34 is adjusted from a first position P1 to a second position P2.

When the claw piece 40b of the engagement claw 40 reaches the position of the through holes 55 of the plate portion 42 of the sliding member 34 from the engagement blocking surface 56, the engagement claw 40 enters the through hole 55 due to the biasing force of the first biasing member 64 (FIG. 4), that is, the force in the second direction D2, and rotates to a position shown by a double dotted line.

FIG. 8B shows a state where the position adjustment to the second position P2 has been completed. That is, the claw pieces 40a and 40b of the engagement claw 40 pass through the through holes 55 of the plate portion 42 and are engaged with the wire which is the positioning portion 38. In this state as well, a force is applied to the engagement claw 40, which is the switching member 36, in the second direction D2 around the pivot member 52 by the biasing force of the first biasing member 64 (FIG. 4). That is, the engagement claw 40 is blocked from being released from the wire 38, and the position-nonadjustable state is obtained.

Moreover, a force is also applied to the operation element 30 shown in FIG. 4, in the second direction D2 around the pivot member 66 by the biasing force of the second biasing member 70, so that the operation element 30 returns to the position before operation, and the position-nonadjustable state is obtained.

In the present embodiment, the linear member 32 has a portion which is bent and guided at the cowl stay 24. The linear member 32 has flexibility and passes through a bending passage by bending deformation. By using such a linear member 32, interference between the power transmission mechanism and another component can be prevented, and the power transmission direction is easily changed, as compared to a power transmission mechanism in which a plurality of link members are combined.

The operation element 30 is disposed at the lower end of a meter or below a meter cover. Accordingly, the linear member 32 and the support portion 60 can be prevented from being exposed to the outside, and the appearance of the vehicle can be improved.

According to the above configuration, the position-adjustable state and the position-nonadjustable state of the windshield 26 (FIG. 1) can be switched by operating the operation element 30. That is, in a state where the operation element 30 is operated with one hand, the windshield 26 can be slid with the other hand. Accordingly, the position of the windshield 26 can be adjusted with a simple structure and a simple operation.

The adjustment support mechanism 28 includes the first biasing member 64 which biases the adjustment support mechanism 28 in the direction A1 in which the position-nonadjustable state is obtained, and the adjustment support mechanism 28 is brought into the position-adjustable state against the biasing force of the first biasing member 64 by operating the operation element 30 in the first direction D1. Therefore, a force is applied only in the first direction D1, which is one direction, by operating the operation element 30, and the operation element 30 returns in the second direction D2, which is the other direction, by the biasing force of the first biasing member 64. Accordingly, the configuration of the adjustment support mechanism 28 is rendered to be simple.

Furthermore, the operation element 30 includes the second biasing member 70 which biases the operation element 30 in the direction A2 in which the position-nonadjustable state is obtained, and the operation element 30 is operated in the first direction D1 against the biasing force of the second biasing member 70. Therefore, the movement of the operation element 30 can be assisted by the first and second biasing members 64 and 70. Accordingly, the linear member 32 is not required to have high rigidity, so that the degree of freedom in material selection is improved.

In addition, by manually operating the operation element 30, the engagement portion 40 moves via the linear member 32, engagement and disengagement of the engagement portion 40 with respect to the positioning portion 38 are switched, the engagement portion 40 moves to the engagement position in the position-nonadjustable state in FIG. 8B, and the engagement portion 40 moves to the disengagement position in the position-adjustable state in FIG. 8A. Accordingly, the need for an electric motor or the like is eliminated, so that the adjustment support mechanism 28 can be configured with a simple structure.

The operation element 30 and the engagement portion 40 are disposed so as to be spaced apart from each other in the longitudinal direction and the vehicle width direction (FIG. 5) of the vehicle body, and connected by the linear member 32. Accordingly, even when the operation element 30 and the engagement portion 40 are disposed at spatially separated positions, interference with other members can be prevented by connecting the operation element 30 and the engagement portion 40 by the linear member 32. Accordingly, the degree of freedom in component arrangement is improved.

As shown in FIG. 5, the engagement portion 40 is disposed at the center portion in the vehicle width direction of the vehicle body, and the operation element 30 is disposed at the position offset in the vehicle width direction from the center portion of the vehicle width direction of the vehicle body. Since the operation element 30 is disposed at the position offset in the vehicle width direction from the center portion in the vehicle width direction of the vehicle body as described above, the operation element 30 is easily operated with one hand.

The sliding member 34 includes the guide portion 35 which slides with respect to the vehicle body, and the positioning portion 38. By separating the guide function and the engagement function as described above, the structure of the adjustment support mechanism 28 can be simplified as compared to the case where both functions are achieved by one portion. In addition, a load is also received at a position other than the engagement position, for example, the guide position, so that a load can be prevented from being concentrated on the engagement portion 40 or the positioning portion 38.

The sliding member 34 includes the engagement blocking surface 56, which blocks the engagement portion 40 at the disengagement position shown in FIG. 8A from moving toward the engagement position. Accordingly, it is not necessary to continue manually applying a force to the operation element 30 (FIG. 4), so that the operability is improved.

Figure 9:
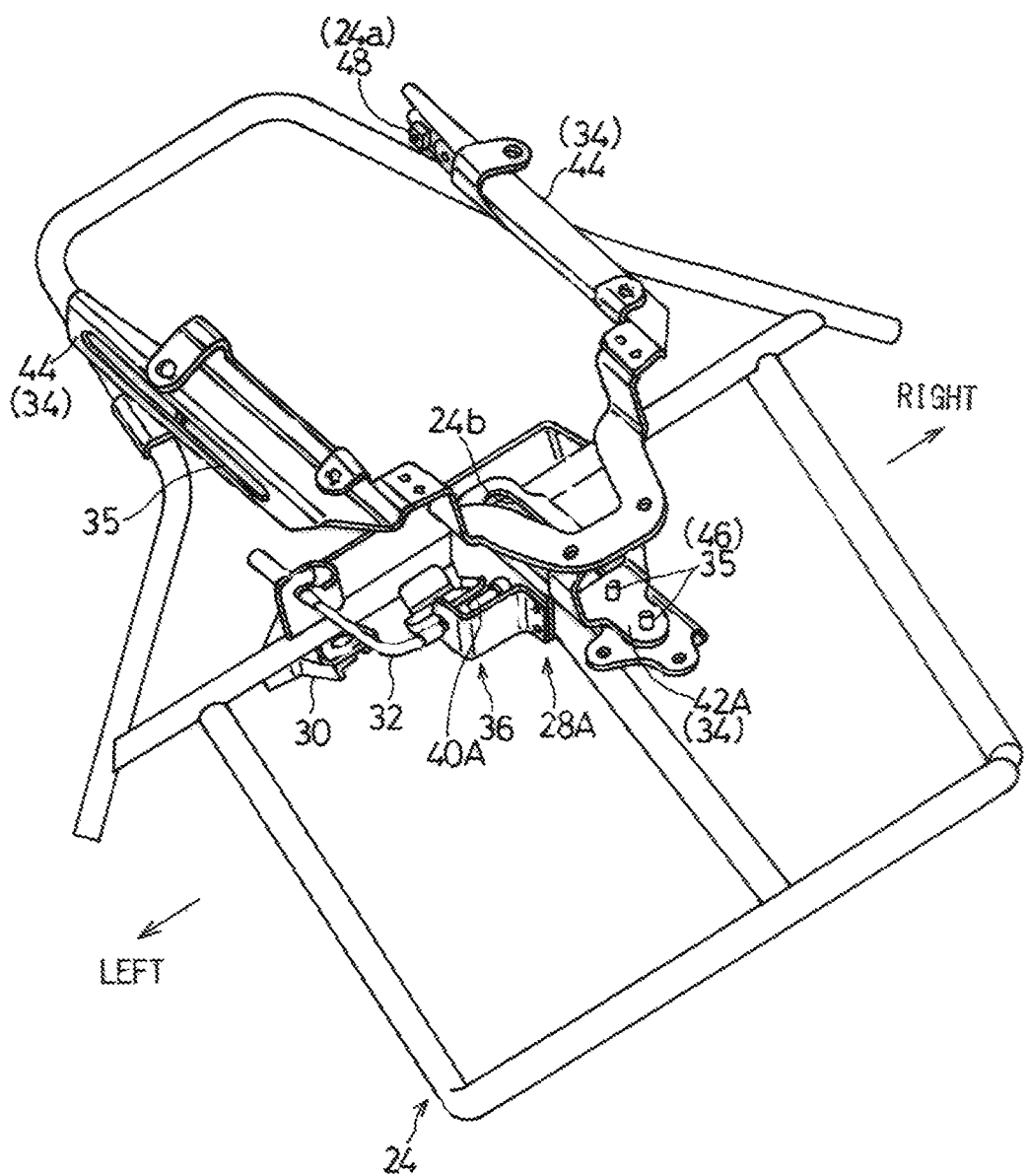
FIG. 9 is a perspective view of a structure for mounting a windshield according to a second embodiment of the present disclosure as seen obliquely from the upper front side.
Figure 10:
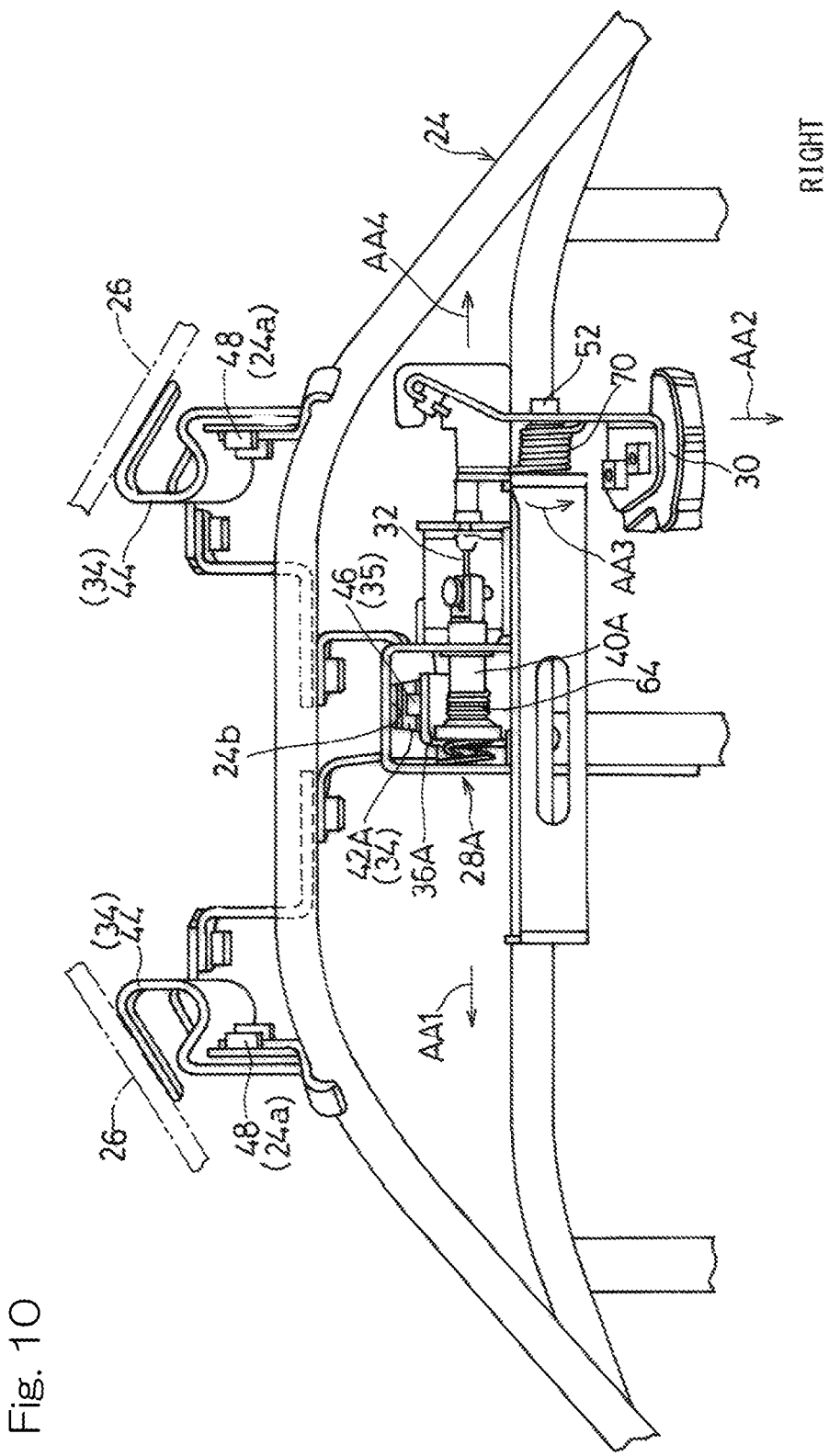
FIG. 10 is a perspective view of the structure for mounting the windshield as seen obliquely from the lower rear side.
Figure 11:
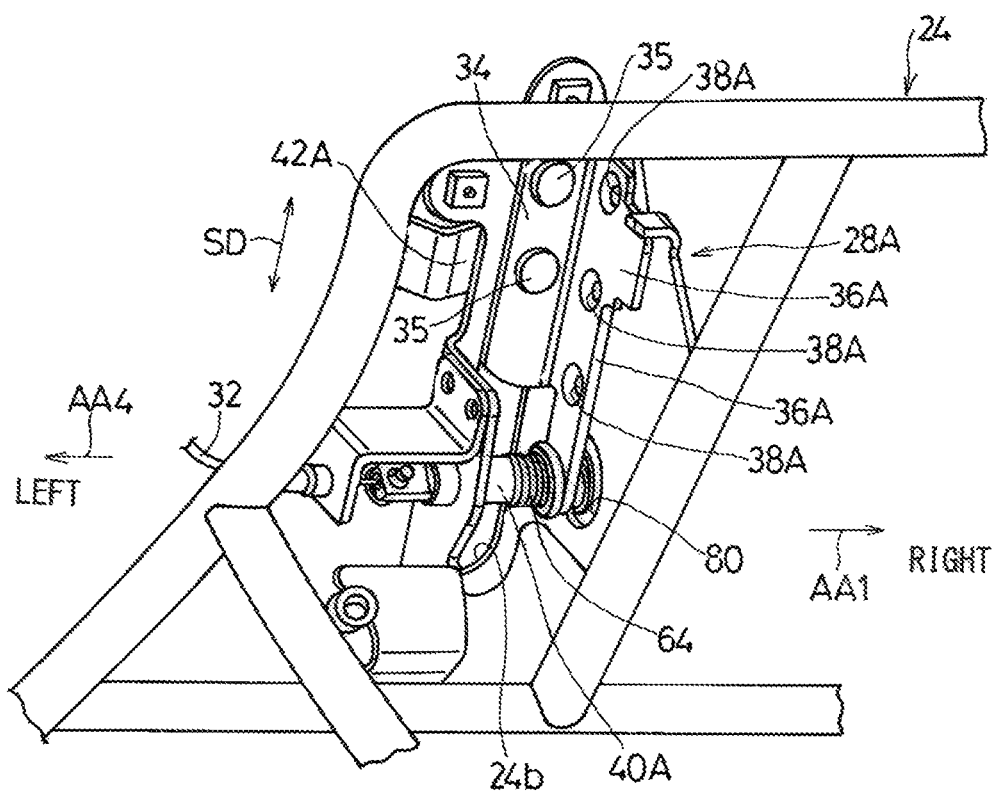
FIG. 11 is a perspective view of the structure for mounting the windshield as seen obliquely from the lower lateral side.

FIGS. 9 to 11 show a structure for mounting a windshield according to a second embodiment of the present disclosure. In the second embodiment, the same components as those of the first embodiment are designated by the same reference signs, and the detailed description thereof is omitted.

In the second embodiment as well, similar to the first embodiment, position adjustment is made possible when an operation force is applied to the operation element 30 in FIG. 9, and is made impossible when the operation force is released. In addition, the operation force applied to the operation element 30 is transmitted via the linear member 32 to an adjustment support mechanism 28A. However, the structure of the adjustment support mechanism 28A is different from that of the adjustment support mechanism 28 of the first embodiment.

In the second embodiment, as shown in FIG. 11, position adjustment is performed by engaging an engagement portion 40A, which is composed of a projection, with engagement holes 38A which are a positioning portion composed of through holes so as to be aligned in the sliding direction SD. The engagement portion 40A is connected to the operation element 30 (FIG. 10) via the linear member 32. In the present embodiment, the engagement holes 38A are disposed in the sliding member 34. In the present embodiment, there are four engagement holes 38A. That is, the position of the windshield 26 can be adjusted in four stages. The number of engagement holes 38A is not limited to four.

A spring force is applied to the projection 40A which is the engagement portion, in the direction of an arrow AA1 by the first biasing member 64. Therefore, in a normal state where no operation force is applied, the projection 40A penetrates through any engagement hole 38A, and further passes through a through hole 80 in the cowl stay 24. Accordingly, by inserting the projection 40A into the through hole 80 of the cowl stay 24, movement of the projection 40A in the sliding direction SD is prevented. Therefore, in the normal state where the operation element 30 shown in FIG. 10 is not operated, the position of the windshield 26 cannot be adjusted.

When an operation force is applied to the operation element 30, that is, the operation element 30 is operated in the direction of an arrow AA2, the second biasing member 70 rotates in the direction of an arrow AA3. Accordingly, the projection 40A is pulled in the direction of an arrow AA4 against the spring force of the first biasing member 64 via the linear member 32. When the linear member 32 is pulled in the direction of the arrow AA4, the projection 40A shown in FIG. 11 comes off from the through hole 80 of the cowl stay 24 and the engagement hole 38A of the sliding member 34. Accordingly, the sliding member 34 is freely movable in the sliding direction SD with respect to the cowl stay 24.

When the sliding member 34 is moved in the sliding direction SD and the desired engagement hole 38A reaches a position that coincides with the position of the projection 40A, the operation force by the operation element 30 is released (the operation element 30 is released). Accordingly, the projection 40A is pulled in the direction of the arrow AA1 by the spring force of the first biasing member 64, and the projection 40A is inserted into the desired engagement hole 38A and the through hole 80 of the cowl stay 24. Due to the above, the adjustment of the position of the windshield 26 is completed.

In the second embodiment in FIG. 9 to FIG. 11 as well, the same advantageous effects as those of the first embodiment in FIG. 1 to FIG. 8B are achieved.

Figure 12:
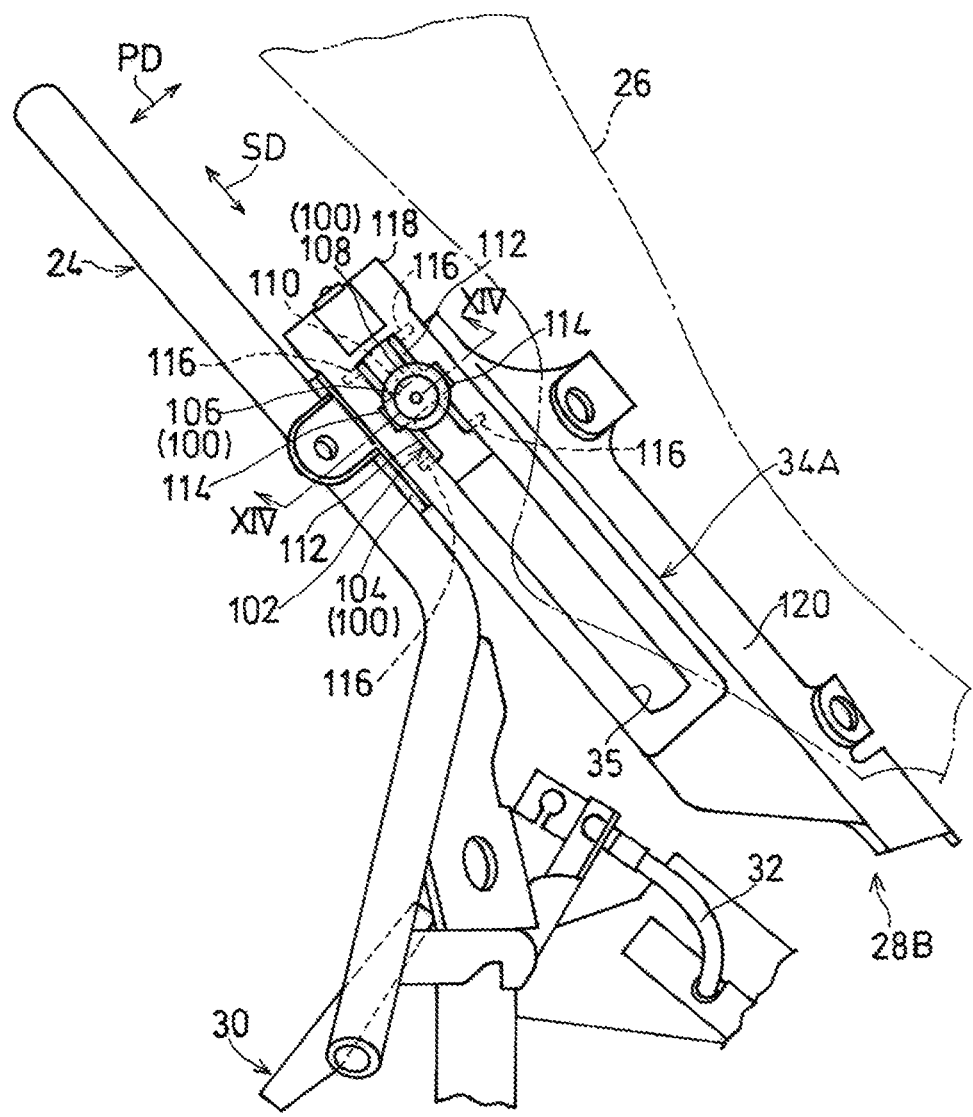
FIG. 12 is a side view showing a structure for mounting a windshield according to a third embodiment of the present disclosure.
Figure 13:
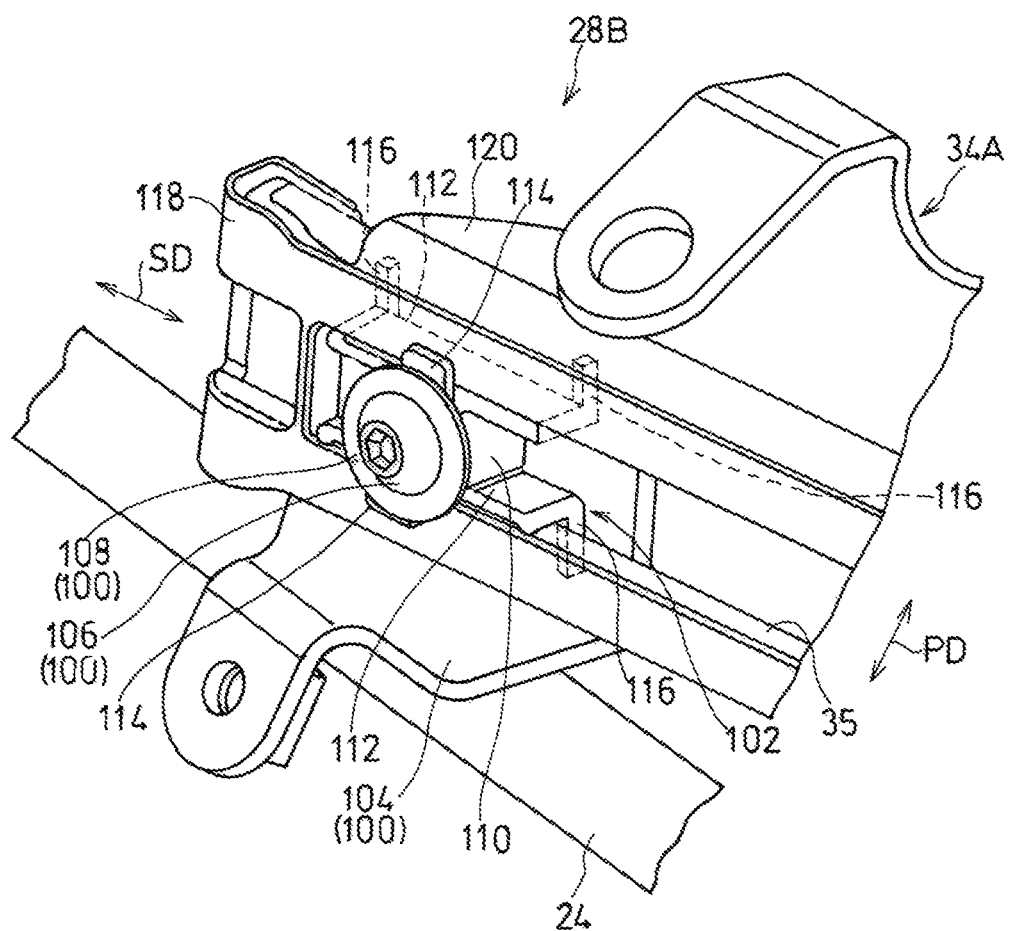
FIG. 13 is an enlarged perspective view showing the structure for mounting the windshield.
Figure 14:
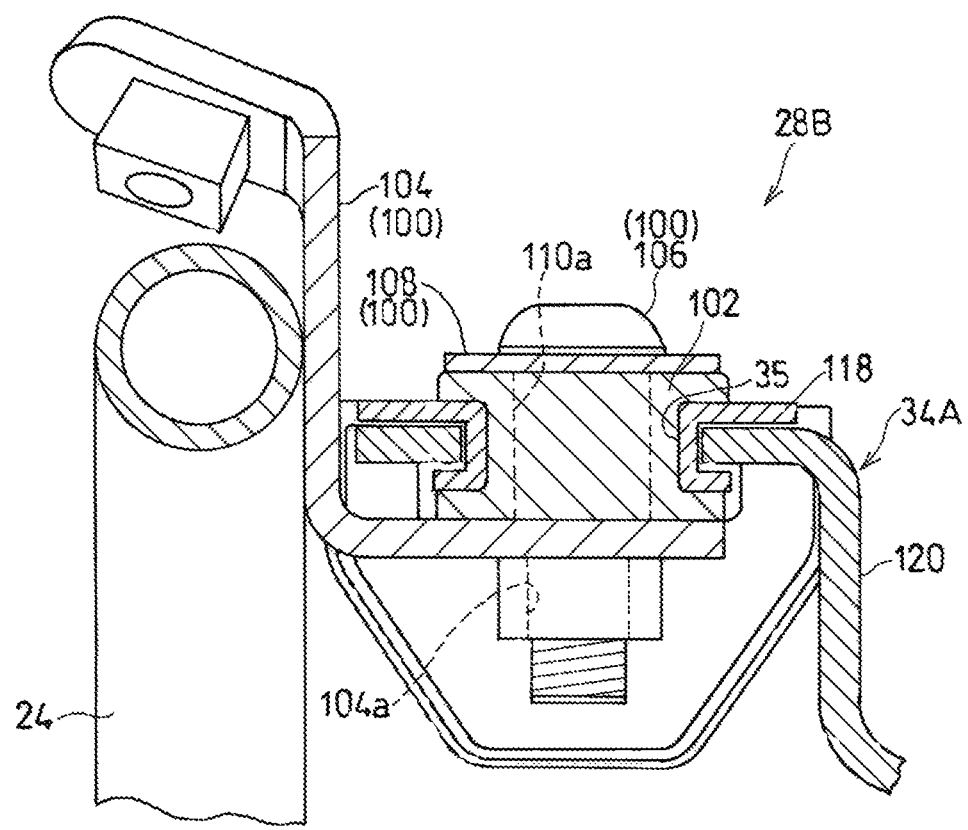
FIG. 14 is a cross-sectional view taken along a line XIV-XIV in FIG. 12.

FIGS. 12 to 14 show a structure for mounting a windshield according to a third embodiment of the present disclosure. In the third embodiment, the same components as those of the first embodiment are designated by the same reference signs, and the detailed description thereof is omitted.

FIG. 12 is a side view showing the structure for mounting the windshield according to the third embodiment, FIG. 13 is an enlarged perspective view of the structure for mounting the windshield, and FIG. 14 is a cross-sectional view taken along a line XIV-XIV in FIG. 12.

In the third embodiment as well, similar to the first and second embodiments, position adjustment is made possible when an operation force is applied to the operation element 30 in FIG. 12, and is made impossible when the operation force is released. In addition, the operation force applied to the operation element 30 is transmitted via the linear member 32 to an adjustment support mechanism 28B. However, the structure of the adjustment support mechanism 28B is different from that of the adjustment support mechanism 28 of the first embodiment.

As shown in FIG. 12, the adjustment support mechanism 28B changes the position of the windshield 26, and includes: a sliding member 34A on which the windshield 26 is mounted; and a guide member 102 which supports the sliding member 34A such that the sliding member 34A is slidable with respect to the vehicle body. The guide member 102 is fixed to the vehicle body, in the present embodiment, to the cowl stay 24.

The windshield 26 is detachably mounted on the sliding member 34A by using a plurality of fastening members, and the sliding member 34A is supported so as to be slidable with respect to the cowl stay 24. Similar to the first embodiment, the sliding member 34A of the third embodiment also includes a guide portion 35 which is slid and guided with respect to the vehicle body. The guide portion 35 is a groove extending in the sliding direction SD.

The guide member 102 is engaged with the guide portion (groove) 35. That is, the sliding member 34A slides in the sliding direction SD along the guide member 102 via the guide portion 35. The guide member 102 is, for example, a molded article made of a resin, and applies tension by an elasticity thereof to the sliding member 34A such that the gap between the guide member 102 and the sliding member 34A is eliminated.

The guide member 102 includes: a tubular portion 110 which has an insertion hole 110a (FIG. 14) in a center portion thereof; and a pair of flat plate portions 112 which extend in parallel from the tubular portion 110. The tubular portion 110 has a quadrangular prism shape, and the insertion hole 110a which is a hollow hole of the tubular portion 110 has a circular shape. The axis of the insertion hole 110a is directed in the vehicle width direction, and the tubular portion 110 has a quadrangular shape having a pair of sides extending in the sliding direction SD and a pair of sides perpendicular thereto in a side view.

The flat plate portions 112 extend in the sliding direction SD from both end surfaces in an orthogonal direction PD, which is orthogonal to the sliding direction SD, in the tubular portion 110. Each flat plate portion 112 has a rectangular flat plate shape, and a main surface thereof faces in the orthogonal direction PD. The orthogonal direction PD is the groove width direction of the guide portion 35. The width of the flat plate portion 112, that is, the dimension in the vehicle width direction of the flat plate portion 112, is substantially equal to the depth of the edge of the groove which is the guide portion 35.

The main surface of each flat plate portion 112 is in contact with the edge of the groove which is the guide portion 35. In other words, the height in the orthogonal direction PD of the tubular portion 110 of the guide member 102, that is, the distance between end surfaces of each flat plate portion 112 of the guide member 102, is substantially equal to the groove width of the guide portion 35. Therefore, the sliding member 34A slides along the end surfaces of each flat plate portion 112 of the guide member 102.

Specifically, the height in the orthogonal direction PD of the guide member 102 is set so as to be slightly larger than the groove width of the guide portion 35. Accordingly, by fitting the guide member 102 into the guide portion 35, tension is applied to the sliding member 34A in the orthogonal direction PD due to the elasticity of the resin, and the gap between the guide member 102 and the sliding member 34A is eliminated. That is, in a state where tension is applied to the sliding member 34A by the guide member 102, the sliding member 34A is slidable along the guide member 102.

The tubular portion 110 of the guide member 102 includes a first projection piece 114 on the outer surface in the vehicle width direction. The first projection piece 114 is integrally formed with the tubular portion 110 by molding. The first projection piece 114 is disposed at both end portions in the orthogonal direction PD of the tubular portion 110, and projects in the orthogonal direction PD from the tubular portion 110.

Each flat plate portion 112 of the guide member 102 includes a second projection piece 116 at an inner end portion thereof in the vehicle width direction. The second projection piece 116 is integrally formed with the flat plate portion 112 by molding. The second projection piece 116 is disposed at both end portions in the sliding direction SD of the inner end portion in the vehicle width direction of each guide member 102, and projects in the orthogonal direction PD from the guide member 102. That is, in the present embodiment, there are two second projection pieces 116 at one guide member 102, namely, four second projection pieces 116 in total.

As shown in FIG. 13, in a state where the guide member 102 is mounted on the guide portion 35, the guide member 102 is held in the sliding member 34A by the first and second projection pieces 114 and 116. Accordingly, the guide member 102 can be prevented from moving or coming off from the sliding member 34A.

The guide member 102 is supported on the vehicle body by a support member 100. The support member 100 includes: a shield mounting portion 104 which is joined to the cowl stay 24; and a fastening member 106 which is fastened to the shield mounting portion 104.

The shield mounting portion 104 is composed of a plate made of a metal, and is joined to the cowl stay 24, for example, by means of welding. The shield mounting portion 104 includes a screw hole 104a therein shown in FIG. 14. The screw hole 104a is, for example, a weld nut.

The fastening member 106 is, for example, a bolt, and is screwed into the screw hole 104a of the shield mounting portion 104. In the present embodiment, a washer 108 is interposed between the fastening member 106 and the sliding member 34A.

As shown in FIG. 14, the fastening member 106 is inserted into the washer 108, the guide portion 35 (through groove) of the sliding member 34A, and the insertion hole 110a of the guide member 102, and then is tightened to the screw hole 104a of the shield mounting portion 104. Accordingly, the sliding member 34A of the adjustment support mechanism 28B is supported so as to be slidable in the position-adjustable state.

At this time, the washer 108 shown in FIG. 13 comes into contact with the first projection piece 114 of the guide member 102, the fastening force of the fastening member 106 is applied to the inner side in the vehicle width direction, and the shield mounting portion 104 comes into contact with the second projection pieces 116 of the guide member 102. Accordingly, the guide member 102 and the sliding member 34A are positioned in the vehicle width direction. The shield mounting portion 104, the fastening member 106, and the washer 108 cooperate together to form the support member 100.

As described above, the guide member 102 is supported on the vehicle body together with the sliding member 34A by the support member 100. In the present embodiment, the sliding member 34A includes a first member 118 which forms the guide portion 35, and a second member 120 on which the windshield 26 is mounted, but may be composed of a single member.

In the third embodiment in FIG. 12 to FIG. 14 as well, the same advantageous effects as those of the first embodiment in FIG. 1 to FIG. 8B are achieved.

In order for the guide portion 35 to move along and relative to the guide member 102 shown in FIG. 12, an appropriate clearance is required between the guide member 102 and the guide portion 35. Due to the clearance, chattering noise and vibration may be conventionally generated by the vibration of an engine.

According to the third embodiment, by setting the height of the guide member 102 to be slightly larger than the groove width of the guide portion 35, the guide member 102, which is made of a resin, applies tension to the sliding member 34A such that the gap between the guide member 102 and the sliding member 34A is eliminated. Accordingly, the gap between the sliding member 34A and the guide member 102 is eliminated, and chattering noise and vibration due to the vibration of the engine can be suppressed.

Moreover, since the guide member 102 is held in the guide portion 35 by applying tension using deflection of the resin, the guide member 102 can be prevented from falling due to its own weight in the position-adjustable state. Furthermore, since the guide member 102 is merely held by the deflection of the resin, the sliding member 34A can be manually slid along the guide member 102 in the position-adjustable state.

The guide member 102 is supported on the vehicle body together with the sliding member 34A by the support member 100. Accordingly, the sliding member 34A can be prevented from coming off from the guide member 102. In addition, since the guide member 102 is fixed to the shield mounting portion 104 which is composed of a plate made of a metal, the strength of the guide member 102 is improved by the rigidity of the metal plate, and the sliding member 34A can be stably guided. As described above, with the above configuration, both stable sliding of the sliding member 34A and suppression of chattering noise and vibration can be achieved with a simple structure.

In the present disclosure, as described above, the adjustment support mechanism may include a first biasing member which biases the adjustment support mechanism in a direction in which the position-nonadjustable state is obtained, and the adjustment support mechanism may be brought into the position-adjustable state against the bias of the first biasing member by the operation element being operated in a first direction. According to this configuration, a force is applied only in one direction (first direction) by operating the operation element, and the operation element returns in the direction opposite to the first direction, by the biasing force of the first biasing member. Accordingly, the configuration of the adjustment support mechanism is rendered to be simple.

In this case, the operation element may include a second biasing member which biases the operation element in a direction in which the position-nonadjustable state is obtained, and the operation element may be operated in the first direction against the bias of the second biasing member. According to this configuration, the movement of the operation element can be assisted by the first and second biasing members. Accordingly, a material having flexibility can be used for the linear member, so that the degree of freedom in material selection is improved.

In the present disclosure, the adjustment support mechanism may change the position of the windshield stepwise; the adjustment support mechanism may include a sliding member on which the windshield is mounted and which is supported so as to be slidable with respect to the vehicle body, and a switching member which is supported on the vehicle body and switches the sliding member between a slidable state and a non-slidable state by moving through operation of the operation element; the sliding member may include a plurality of positioning portions so as to be aligned in a sliding direction; the switching member may include an engagement portion which is engaged with the positioning portion; by the operation element being manually operated, the engagement portion may move via the linear member, and engagement and disengagement of the engagement portion with respect to the positioning portion may be switched; and the engagement portion may move to an engagement position in the position-nonadjustable state, and may move to a disengagement position in the position-adjustable state. According to this configuration, the need for an electric motor or the like is eliminated, so that the adjustment support mechanism can be configured with a simple structure.

In this case, the operation element and the engagement portion may be disposed so as to be separated from each other in a longitudinal direction of the vehicle body and a vehicle width direction of the vehicle body, and may be connected by the linear member. According to this configuration, by connecting the operation element and the engagement portion by the linear member, the operation element and the engagement portion can be disposed so as to be separated from each other. Therefore, interference between the operation element or the engagement portion and another member can be prevented. Accordingly, the degree of freedom in component arrangement is improved.

In this case, the engagement portion may be disposed at a center portion in the vehicle width direction of the vehicle body, and the operation element may be disposed at a position offset in the vehicle width direction from the center portion in the vehicle width direction of the vehicle body. According to this configuration, since the operation element is provided at the position offset in the vehicle width direction from the center portion in the vehicle width direction of the vehicle body, interference of the operation element with a component disposed at the center portion in the vehicle width direction can be prevented.

In the case where the switching member includes the engagement portion, the sliding member may include a guide portion which slides with respect to the vehicle body. According to this configuration, by separating the guide function and the engagement function, the structure of the adjustment support mechanism can be simplified as compared to the case where both functions are achieved by one portion. In addition, a load is also received at a position other than the engagement position (for example, the guide position), so that a load can be distributed and prevented from being concentrated on the engagement portion.

In the present disclosure, the sliding member may include an engagement blocking surface which blocks the engagement portion at the disengagement position from moving toward the engagement position. According to this configuration, it is not necessary to continue manually applying a force to the operation element, so that the operability is improved.

In the present disclosure, the adjustment support mechanism may include: a sliding member on which the windshield is mounted; and a guide member fixed to the vehicle body and supporting the sliding member such that the sliding member is slidable with respect to the vehicle body, and the guide member may apply tension to the sliding member such that a gap between the guide member and the sliding member is eliminated. According to this configuration, by the guide member applying tension to the sliding member, the gap between the sliding member and the guide member is eliminated, and chattering noise and vibration due to the vibration of the engine can be suppressed.

In this case, the guide member may be supported on the vehicle body together with the sliding member by a fastening member. According to this configuration, sliding of the sliding member and suppression of chattering noise and vibration can be achieved with a simple structure.

The present disclosure is not limited to the above-described embodiments, and various additions, changes, or deletions can be made without departing from the gist of the present disclosure. For example, although the example in which the structure for mounting the windshield according to the present disclosure is applied to the motorcycle has been described in the above embodiments, the structure for mounting the windshield according to the present disclosure can also be applied to vehicles such as a three-wheeled vehicle or four-wheeled vehicle for running on rough terrain, in addition to the motorcycle. Therefore, these are construed as included within the scope of the present disclosure.

What is claimed is:

1. A structure for mounting a windshield which suppresses incoming wind received by a driver of a vehicle, the structure comprising:
   an adjustment support mechanism which supports the windshield such that the windshield is slidable with respect to a vehicle body;
   an operation element operated when a position of the windshield is adjusted; and
   a linear member connecting the adjustment support mechanism and the operation element, wherein
   the adjustment support mechanism is switched between a position-adjustable state and a position-nonadjustable state via the linear member by the operation element being operated,
   the adjustment support mechanism changes the position of the windshield stepwise,
   the adjustment support mechanism includes:
      a sliding member on which the windshield is mounted and which is supported so as to be slidable with respect to the vehicle body; and
      a switching member supported on the vehicle body, the switching member switching the sliding member between a slidable state and a non-slidable state by moving through operation of the operation element,
   the sliding member includes a plurality of positioning portions arranged so as to be aligned in a sliding direction,
   the switching member includes an engagement portion which is engaged with the positioning portion,
   by the operation element being manually operated, the engagement portion moves via the linear member, and engagement and disengagement of the engagement portion with respect to the positioning portion are switched, and
   the engagement portion moves to an engagement position in the position-nonadjustable state, and moves to a disengagement position in the position-adjustable state.

2. The structure for mounting the windshield as claimed in claim 1, wherein
   the adjustment support mechanism includes a first biasing member which biases the adjustment support mechanism in a direction in which the position-nonadjustable state is obtained, and
   the adjustment support mechanism is brought into the position-adjustable state against the bias of the first biasing member by the operation element being operated in a first direction.

3. The structure for mounting the windshield as claimed in claim 2, wherein
   the operation element includes a second biasing member which biases the operation element in a direction in which the position-nonadjustable state is obtained, and
   the operation element is operated in the first direction against the bias of the second biasing member.

4. The structure for mounting the windshield as claimed in claim 1, wherein the operation element and the engagement portion are disposed so as to be separated from each other in a longitudinal direction of the vehicle body and a vehicle width direction of the vehicle body, and are connected by the linear member.

5. The structure for mounting the windshield as claimed in claim 1, wherein the engagement portion is disposed at a center portion in the vehicle width direction of the vehicle body, and
   the operation element is disposed at a position offset in the vehicle width direction from the center portion in the vehicle width direction of the vehicle body.

6. The structure for mounting the windshield as claimed in claim 1, wherein the sliding member includes a guide portion which slides with respect to the vehicle body.

7. The structure for mounting the windshield as claimed in claim 1, wherein the sliding member includes an engagement blocking surface which blocks the engagement portion at the disengagement position from moving toward the engagement position.

8. A structure for mounting a windshield which suppresses incoming wind received by a driver of a vehicle, the structure comprising:
   an adjustment support mechanism which supports the windshield such that the windshield is slidable with respect to a vehicle body;
   an operation element operated when a position of the windshield is adjusted; and
   a linear member connecting the adjustment support mechanism and the operation element, wherein
   the adjustment support mechanism is switched between a position-adjustable state and a position-nonadjustable state via the linear member by the operation element being operated,
   the adjustment support mechanism includes:
      a sliding member on which the windshield is mounted; and
      a guide member fixed to the vehicle body and supporting the sliding member such that the sliding member is slidable with respect to the vehicle body in a sliding direction,
   the sliding member includes a guide portion which comprises a groove extending in the sliding direction,
   the guide member has an elasticity and passes through the groove in an extending direction so as to be engaged with the guide portion,
   the guide member has a height in a groove width direction, which is set so as to be slightly larger than a groove width of the guide portion,
   by engaging the guide member with the guide portion, the guide member applies tension to the sliding member such that a gap between the guide member and the sliding member is eliminated,
   the guide member is supported on the vehicle body together with the sliding member by a fastening member,
   the guide member has: opposite end surfaces in the extending direction; and first and second projection pieces provided in the opposite end surfaces, respectively, and
   in a state where the guide member is mounted on the guide portion, the guide member is held in the sliding member by the first and second projection pieces.

9. A structure for mounting a windshield which suppresses incoming wind received by a driver of a vehicle, the structure comprising:

an adjustment support mechanism which supports the windshield such that the windshield is slidable with respect to a vehicle body;

an operation element operated when a position of the windshield is adjusted; and a linear member connecting the adjustment support mechanism and the operation element, wherein the adjustment support mechanism is switched between a position-adjustable state and a position-nonadjustable state via the linear member by the operation element being operated, the operation element and the adjustment support mechanism are disposed so as to be separated from each other in a longitudinal direction of the vehicle body.

10. The structure for mounting the windshield as claimed in claim 9, wherein the adjustment support mechanism includes:

a sliding member on which the windshield is mounted and which is supported so as to be slidable with respect to the vehicle body; and a switching member supported on the vehicle body, the switching member switching the sliding member between a slidable state and a non-slidable state by moving through operation of the operation element, the operation element and the switching member are disposed so as to be separated from each other in a longitudinal direction of the vehicle body and a vehicle width direction of the vehicle body.

11. The structure for mounting the windshield as claimed in claim 10, wherein the switching member is disposed at a center portion in the vehicle width direction of the vehicle body, and the operation element is disposed at a position offset in the vehicle width direction from the center portion in the vehicle width direction of the vehicle body.

* * * * *